Jan. 6, 1942.   R. J. KENNEDY   2,268,549
APPARATUS FOR INDICATING EFFICIENCY
Filed July 12, 1937   3 Sheets-Sheet 1
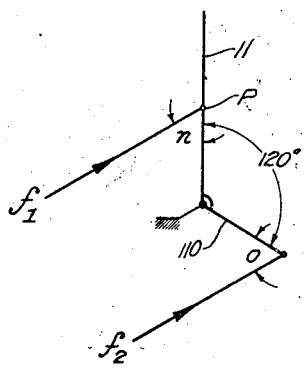
Fig.1a.
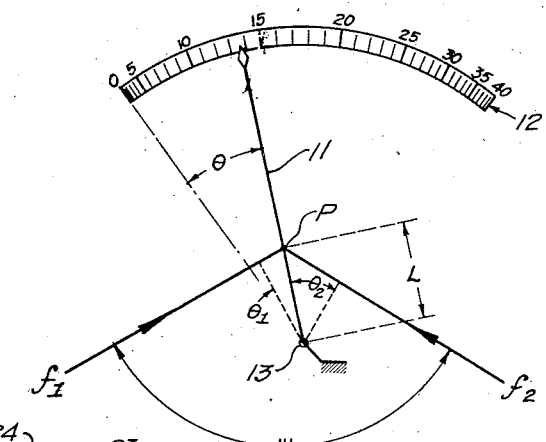
Fig.1.
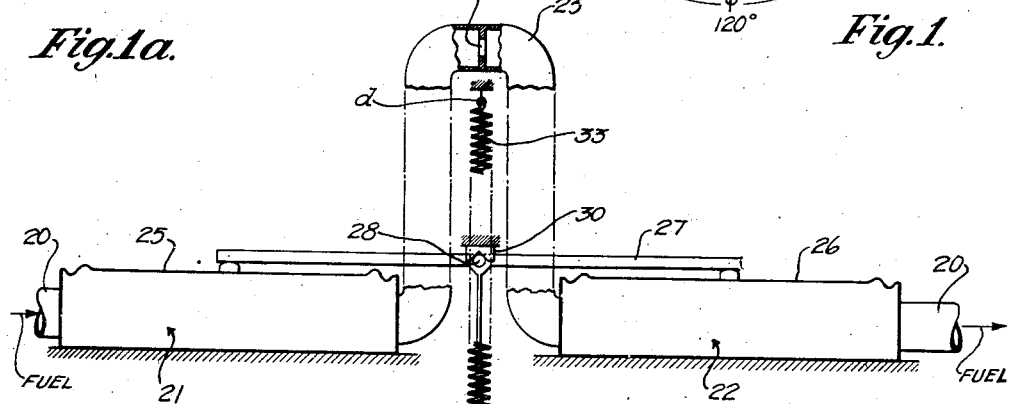
Fig.2.
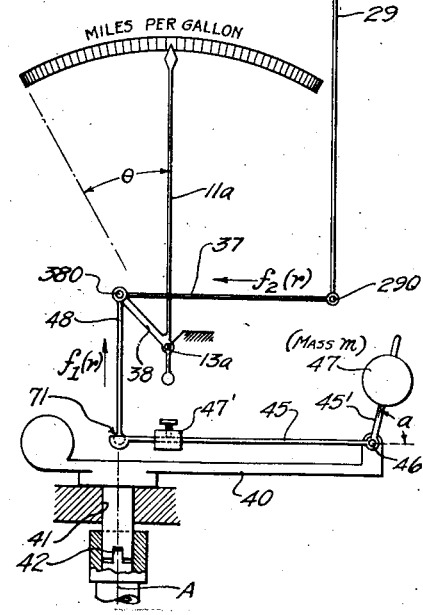
Inventor
Roy J. Kennedy.
Attorney Jan. 6, 1942.  R. J. KENNEDY  2,268,549
APPARATUS FOR INDICATING EFFICIENCY
Filed July 12, 1937  3 Sheets-Sheet 2

Inventor
Roy J. Kennedy.

Attorney.

Jan. 6, 1942.   R. J. KENNEDY   2,268,549
APPARATUS FOR INDICATING EFFICIENCY
Filed July 12, 1937   3 Sheets-Sheet 3
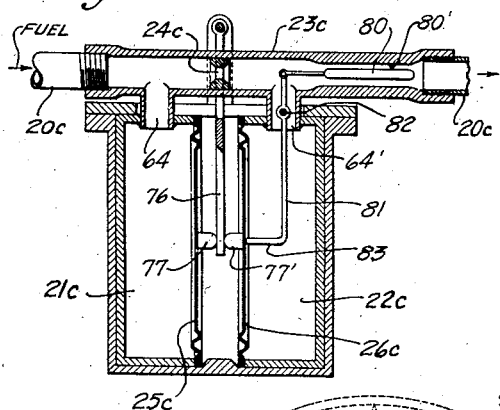
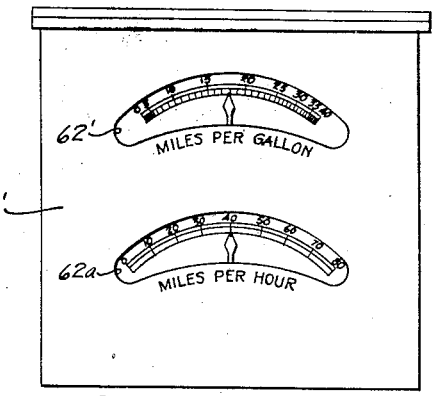
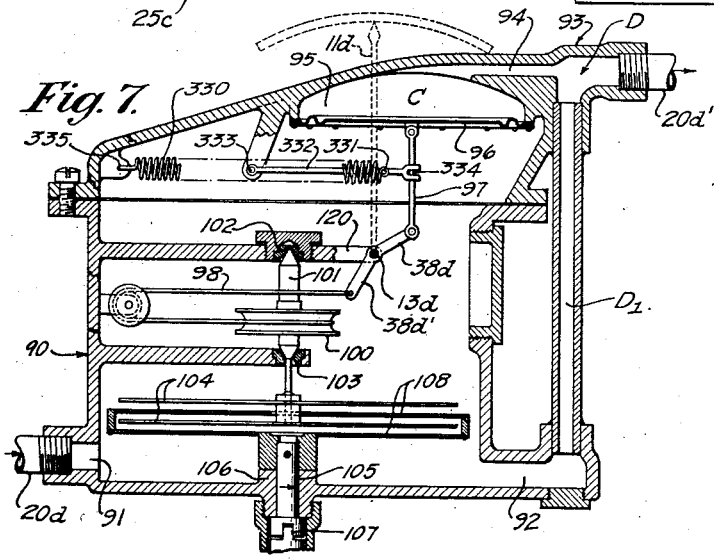
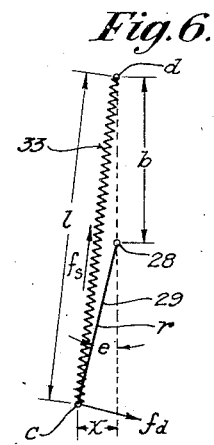
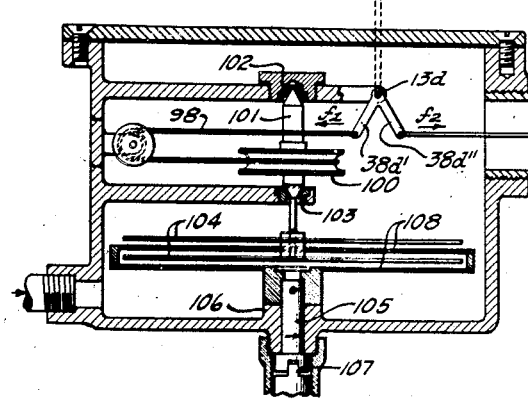
Inventor
Roy J. Kennedy.
Attorney.

Patented Jan. 6, 1942

2,268,549

UNITED STATES PATENT OFFICE 2,268,549

APPARATUS FOR INDICATING EFFICIENCY

Roy J. Kennedy, Pasadena, Calif., assignor of one-third to Myrtle Kurth and one-third to James T. Barkelew, both of Pasadena, Calif.

Application July 12, 1937, Serial No. 153,219

5 Claims. (Cl. 235—61)

This invention has to do generally with efficiency indicators and is more particularly related to improved means for continuously indicating the efficiency of an internal combustion engine or motor vehicle obtained, for example, as the ratio between time rate of accomplishment (speed) and time rate of fuel consumption, and expressed (in the case of a motor vehicle) as miles per gallon.

I am aware that various devices have been proposed for accomplishing the general objective outlined above, but so far as I know, such prior devices have been unsuccessful due, primarily, to the fact that their readings are materially affected by certain variable factors such as viscosity of the fuel. This factor, for example, varies with temperatures in the same fuel and also varies with different fuels.

It therefore becomes a primary object of this invention to provide a device of the class described in which the operation thereof is not affected by such variable factors as viscosity of the fuel. In this regard, my invention contemplates an instrument which includes a freely supported indicator under the control of two opposed torques acting about the axis of the indicator and proportional to the same simple algebraic power of the speed and the rate of fuel consumption respectively.

The device contemplated by this invention may be rendered independent of the action of viscosity in various ways. For example, the force derived from the flow of fuel may be obtained through means, such as the pressure differential across an orifice, which is substantially independent of viscosity, or both forces or torques may be obtained through means in which the element of viscosity enters into the obtainment of each force or torque to the same extent so that it, in effect, cancels out in the operation of the instrument which indicates the ratio of the two forces.

It is a further object of this invention to provide a device of the class described which may readily be combined and operated in conjunction with a speedometer or odometer of either the mechanical or magnetic type.

A still further object of the invention is to provide a device of the class described which can be economically and compactly constructed and can be easily installed.

It is also an object to provide a device which is simple in its essentials of structure and operation, and therefore free of the many minor difficulties and inaccuracies that have attended many prior devices which have been proposed.

In the embodiments of my invention, chosen for purpose of illustration herein, the force proportioned to the rate of flow is obtained through the use of pressure responsive means such as a diaphragm and my invention contemplates, as a further important feature, the provision of means for compensating or correcting for the restoring forces inherent in such diaphragms. In this way the action of the pressure responsive member corresponds to that of a fully flexible diaphragm for all positions thereof.

The form of my invention employing an orifice as the means for obtaining a force proportioned to fuel flow, is for all ordinary purposes independent of the viscosity of the fuel. In the case of a precision instrument for absolutely accurate measurements, it may be desirable to provide means to correct or compensate for such minor effects as viscosity may have upon the pressure differential resulting from flow through the orifice. In this regard, my invention also contemplates as a further object the provision of means for automatically making such compensation.

The details in the construction of certain preferred embodiments of my invention, and the method involved in the practice thereof, together with other objects and advantages attending its production, will be best understood from the following description of the accompanying drawings, which are chosen for illustrative purposes only and in which:

Fig. 1 is a diagrammatic view illustrating the principle involved in the operation of my invention;

Fig. 1a is a diagram illustrative of modified orientation of the forces indicated in Fig. 1;

Fig. 2 is a diagrammatic view illustrating one manner in which the principle of my invention may be applied in an instrument;

Fig. 5 is a fragmentary section illustrating a modification of the pressure responsive system shown in Fig. 3;

Fig. 6 is a diagram illustrating the manner of designing the means for compensating for the restoring forces in the pressure responsive means;

Fig. 7 is a sectional elevation more or less diagrammatic in nature, illustrating another modified form of the invention;

Fig. 8 is an outside elevation illustrating the manner in which an efficiency meter of the type disclosed herein can be combined in a single case with a speedometer; and Fig. 9 is a diagrammatic section showing another modified form.

Figure 3:
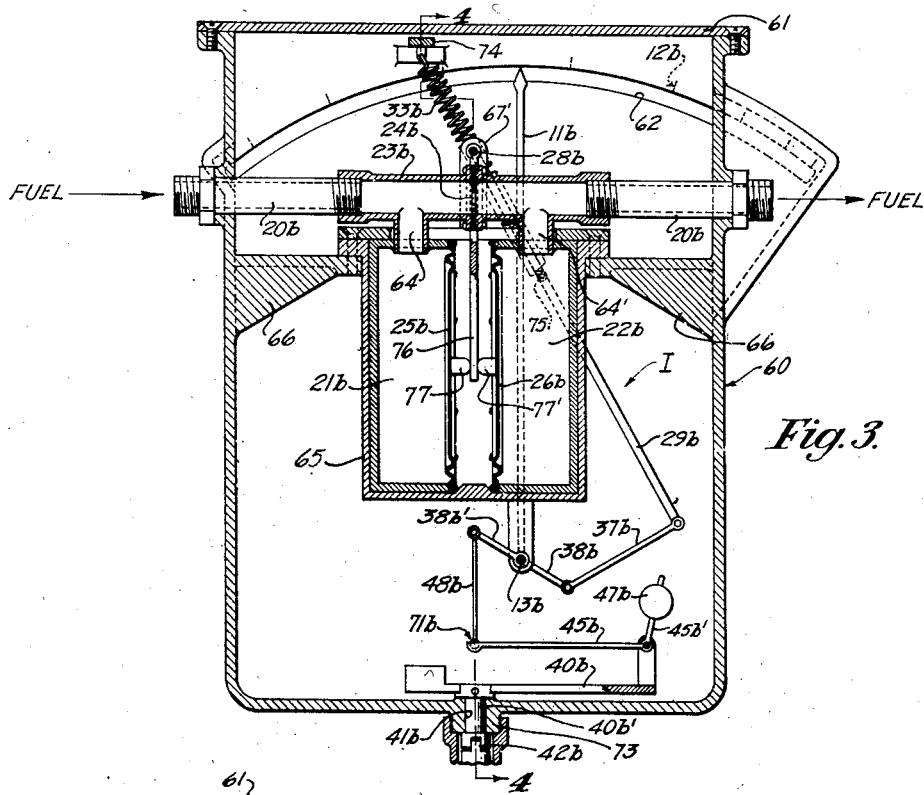
Fig. 3 is a sectional elevation illustrating another manner in which the principle illustrated in Figs. 1 and 2 may be applied in an instrument.

The principle involved in the method and apparatus contemplated by this invention is based upon the general proposition that the ratio between two forces can be determined in terms of the position of a pointer or other suitable indicating means which is rotatable about an axis and is otherwise free except for the two forces.

Referring now to Fig. 1, numeral 11 indicates a pointer associated with a scale 12, such pointer being pivotally supported for swinging movement about an axis 13. The forces above referred to are indicated by the vectors $f_1$ and $f_2$, such forces being applied to the pointer 11 (or other suitable radius arm) at point P at a distance L from the axis 13.

For equilibrium, the moments of the forces $f_1$ and $f_2$ about the axis 13 must be equal in magnitude and opposite in direction thus:

$$f_1 L \cos\theta_1 = f_2 L \cos\theta_2$$

where $\theta_1$ and $\theta_2$ are the angles between the pivoted arm and the respective force vectors.

From the above equation it follows that (1) $\qquad \dfrac{f_1}{f_2} = \sin\psi \tan\theta_1 - \cos\psi$ where $\psi$ is the angle between the two forces. Thus it is demonstrated that the ratio of the forces is a simple function of the angle between the pointer and one of the forces. If $\psi$ is 90°, this reduces to the simple relation $$\dfrac{f_1}{f_2} = \tan\theta_1$$

but in some cases it will be advantageous to choose another value for $\psi$. For example, if $\psi$ is set approximately equal to 120° and the forces are directed so that the angle $\theta$ of the pointer measured from zero position is equal, or approximately equal to $\theta_1 + 30°$, and the forces are symmetrically directed when the pointer is in the middle of the scale, there results a practically linear scale over a wide range for a type of instrument in which the forces applied are proportional to the first powers of the rate of performance (speed) and to the rate of flow (fuel consumption). Another way of expressing the same thing is to say that, when the pointer is in the medial portion of the scale, the lines of forces $f_1$ and $f_2$ should be arranged to be symmetric with relation to the arm (or arms) on which they act.

The angle $\psi$ is not necessarily constant and may be allowed to vary with $\theta$, and it will be understood that the forces $f_1$ and $f_2$ may be obtained and applied in various ways. For example, the forces $f_1$ and $f_2$ may be applied to the pointer mechanism through links, cams, or the like, the only restriction being that their ratio must be expressible as a function of $\theta$. The manner of obtaining forces proportioned to the rates whose ratio is to be obtained will be later described.

In order that the position of the pointer (angle $\theta$) may be used as an accurate indication of the efficiency of an engine or motor vehicle, for example, it is necessary that the two forces $f_1$ and $f_2$ which determine its position, bear a definite relation respectively to the speed $s$ and the rate of fuel consumption $r$. The condition to be satisfied may be expressed as follows:

$$\theta = g\left(\dfrac{s}{k}\right)$$

From above discussion we have also $$h(\theta) = \dfrac{f_1(s,\ \ldots)}{f_2(r,\ \ldots)}$$

hence $$f\left(\dfrac{s}{r}\right) = \dfrac{f_1(s,\ \ldots)}{f_2(r,\ \ldots)}$$

where $f$, $g$ and $h$ are arbitrary functions depending on the structure of the instrument and $f_1$ and $f_2$ express the respective forces. The dots in the last ratio indicate that variables other than $s$ and $r$ alone, such as fuel viscosity, may possibly contribute to the forces.

This last mentioned condition can be shown by purely mathematical considerations to limit the forces to the form $$f_1 = \phi_1(\ldots)\, s^k \text{ and } f_2 = \phi_2(\ldots)\, r^k$$

where the variables in the proportionality factors $\phi_1$ and $\phi_2$ must occur, if at all, in such a way that they cancel in the ratio $$\dfrac{\phi_1}{\phi_2}$$

If for example variable characteristics of fuels, such as viscosity, are permitted to enter as factors not satisfying this requirement, various inaccuracies will be introduced. Still more important to the success of an instrument operating upon the principle outlined above, is the requirement indicated by these equations that the forces be proportional to the same algebraic power ($k$) of the two respective rates.

As has been indicated above the principle of operation just outlined may be incorporated in various types of instruments, and in Fig. 2. I have schematically illustrated a device in which the forces $f_1$ and $f_2$ are proportioned to the second powers ($k=2$) of the two rates $r$ and $s$ respectively and in which the force $f_2$ and (the only one dependent upon the fuel in this form) is obtained in such a manner that it is substantially independent of viscosity.

Referring now to Fig. 2, the fuel line leading to the engine is indicated by reference numeral 20, such line containing two pressure chambers 21 and 22 positioned on opposite sides of an intermediate fuel line section 23 which contains an orifice 24. The two chambers 21 and 22 are equipped with pressure responsive diaphragms 25 and 26, the centers of which engage the ends of an actuating member shown as comprising a bar 27. The bar 27 is affixed to pivot shaft 28 which engages bearings 30; and the bar 27, shaft 28 and arm 29 form a rigid system. In the form shown the bearing 30 is illustrated as a knife edge bearing and the shaft is held in engagement therewith by a tension spring 33, the further function of which will be later described.

Since the respective pressures in the chambers 21 and 22 will differ by an amount which is proportional to the square of the velocity of flow in the line 20 through the orifice 23, and since such pressures are, for all practical purposes, independent of the viscosity of the fuel, this pressure differential acting upon the diaphragms 25 and 26, will apply a moment to the arm 29 about its axis 30 which is proportioned to the second power ($k=2$) of the rate of flow.

The lower end of the arm 29 is shown as being connected at point 290 to a link 37, which in turn is pivoted at point 380 to an arm 38 on the indicator shaft 13a. It is of no particular consequence that these connections, or the connections of the link 48, hereinafter referred to, be particularly well fitted. The shaft 13a carries an indicator 11a corresponding to the indicator 11 of Fig. 1.

Obviously, through this arrangement the force $f_2$ applied by the link 37 to the pointer mechanism exerts a torque on such mechanism, proportioned to the square of the rate of fuel flow, which tends to rotate the pointer in a counterclockwise direction.

Reference numeral 40 indicates a rotor supported in a bearing 41 on rotation axis A and adapted to be driven through a connection 42 by the engine or propeller shaft of car (not shown). For a motor vehicle the rotor 40 may be driven by the conventional speedometer cable or a connection similar thereto.

Reference numeral 45 indicates a radial arm pivoted at 46 at the end of the rotor 40, such arm having an angular extension 45', extending upwardly at the angle $a$, and carrying a weight 47 of mass $m$. The arm 45 may be provided with a counterbalance 47', and at 71 is connected through a ball and socket, or other similar connection, with a link 48. The link 48 is also attached to the arm 38 at point 380, or to any arm on the pointer shaft 13a. The connection at 71 is preferably located as closely as may be in the axis A of rotation of rotor 40.

The function of the counterbalance 47', or equivalent mass distribution in arm 45 or the connected parts, is to gravitationally balance the moving system, 45, 45', 47, 48. The moving system 27, 29, 37 is likewise gravitationally balanced. Then, if the pointer 11a, with arm 38, is similarly gravitationally balanced, the whole interconnected system is free to assume any position; and, in operation, its equilibrium position will depend only on the forces $f_1$ and $f_2$ applied to it.

Now assuming that the rotor 40 is driven at an angular velocity $w$, the upward force $f_1$ on the link 48 due to the centrifugal force of the weight 47 may be expressed as follows:

$$(2) \quad f_1 = mw^2 \left( R_2 + \frac{R_2^2}{R_1} \cos a \right) \sin a$$

where $R_1$ and $R_2$ are the lengths of arms 45 and 45' respectively and $a$ is the angle between 45 and 45'; and assuming that, in the operation of the instrument, the arm 45 moves through no large angle from a normal or medial position in a plane at right angles to the axis of rotation A.

This force can be made sensibly dependent only on the speed by having the radial arm 45—45' bent or formed at an angle such that the following equation is satisfied.

$$\cos a = \sqrt{\tfrac{1}{2} + \tfrac{1}{16}\tfrac{R_1^2}{R_2^2} - \tfrac{1}{4}\tfrac{R_1}{R_2}}$$

assuming $R_1$ is four times the length $R_2$, this angle works out approximately to 77°.

Since the values $m$, $R_1$, $R_2$ and $a$ are all constant in Equation 2 above for any given instrument it will be seen that the force $f_2$ is proportional to the second power of the speed. Thus the two forces $f_1$ and $f_2$ in the device shown in Fig. 2 are both proportional to the same (second) algebraic power of the rate of flow and rate of performance.

Since the forces actually transmitted by the pressure responsive diaphragms 25 and 26 are dependent not only on the pressures, but also on the displacements of the diaphragms it is important to provide some means to compensate for the restoring forces in the diaphragms. The diaphragms cannot be perfectly flexible, but when displaced exert restoring forces which may be a large fraction or even a multiple of those forces depending on the pressure differences. This difficulty can be eliminated in the device contemplated by this invention by means of the spring 33 or its equivalent.

This spring is shown as being attached at the point $c$ on the lever arm 29 and extends back along the median position of the arm, assumed when the diaphragms are undisplaced, to a fixed point of attachment $d$.

Referring now to Fig. 6 which illustrates the principle involved in the operation of this spring, the vectors $f_d$ and $f_s$ indicate the restoring force of the diaphragms and the force of the spring, respectively. The fixed point of spring attachment $d$ is located a distance $b$ from the axis 28 of the arm 29 which is acted upon by the diaphragms. For purpose of illustration here this arm is indicated by the line of length $r$ and the displacement by the diaphragms at the point of connection $c$ is represented by the distance X. The angle through which the spring connected arm is displaced is indicated by $e$.

Knowing the restoring force constant $K_d$ of the diaphragms, the spring constant $K_s$ for a chosen value of $r$ and $b$ may be mathematically shown to be expressed as follows:

$$K_s = \frac{K_d}{b^2}(r^2 + 3rb + b^2)$$

and for these same conditions the unstretched length $L_u$ of the spring should be $$L_u = \frac{(r+b)^3}{r^2 + 3rb + b^2}$$

Assuming, for instance, that $r$ and $b$ are equal, then the spring constant $K_s$ turns out to be five times the diaphragms restoring constant $K_d$; and the unstretched length of the spring is then eight-fifths of $b$ or $r$.

The position of spring 33, with relation to the line of arm 29, is such that the spring parallels the arm when the diaphragms 25 and 26 are unstressed.

I have found that when the above conditions are satisfied, the restoring force of the diaphragms is compensated, so that the diaphragms are for all practical purposes equivalent in action to perfectly flexible members.

Assuming now the figures, dimensions and ratios already given, I will now give approximately a set of typical dimensions for an instrument designed to indicate the miles-per-gallon of an average automobile consuming an average amount of fuel. Assuming that the average miles-per-gallon at an ordinary speed is twenty, it will first be postulated that for that efficiency the indicator 11a should be somewhere around the middle of the scale; in an equilibrium position somewhat like the position shown in Fig. 2.

Satisfactory operation, in an instrument of reasonable dimensions can then be had if, for instance, the diaphragms are about 3 cm. diameter, orifice 24 is 2.25 mm.² area; bar 27 the same length as arm 29; arm 45, 2.5 cm.; arm 45' one fourth the length of arm 45; and mass 47 (or the effective centrifugal mass considered as concentrated at the position of 47) to be 10 grams, assuming that the ordinary R. P. M of rotor 40 is 240.

This set of figures assumes that the arm 38 on indicator shaft 13a is either connected at the same arm length to both links 37 and 48; or, if two arms are used instead of one 38 they are of the same length If these two arms are of different lengths then those differences will entail compensating variations from the figures given.

Figure 4:
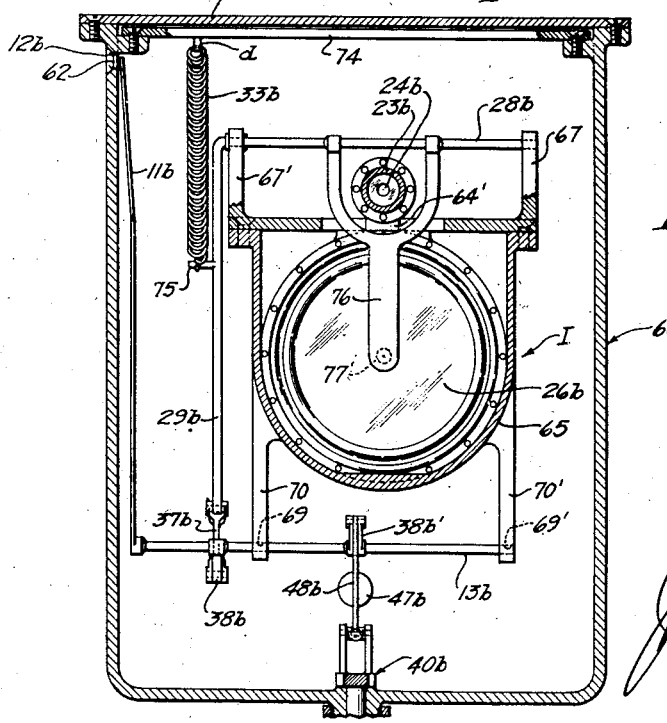
Fig. 4 is a sectional elevation taken along the line 4—4 of Fig. 3.

In Figs. 3 and 4 I have illustrated a physical embodiment of the invention which may be constructed to incorporate the principles discussed above in connection with Figs. 1, 2 and 6.

In this form of my invention the operating mechanism of the instrument (indicated generally at I) is shown as being contained within a case 60 having a removable cover 61. A slot 62 is shown as being provided in one of the walls of the case through which the pointer 11b is visible. The slot 62 is associated with a scale 12b. The scale 12b as has been demonstrated above is dependent on $\sqrt{\tan \theta}$ and in the case of an instrument for motor vehicles will be calibrated in miles-per-gallon.

The fuel conduit 20b in this form of my invention is shown as being comprised of two sections mounted in either end of a jointed intermediate section 23b which contains the orifice plate 24b. The pressure chambers 21b and 22b are shown as being suspended below this intermediate section 24b and as being in communication therewith at opposite sides of orifice 24 through connection 64 and 64'. These pressure chambers 21b and 22b are provided with pressure responsive diaphragms 25b and 26b and are shown as being physically supported and enclosed in a container or cup indicated by reference numeral 65. This container or cup may be supported within the housing in any suitable manner, as by means of the bracket members generally indicated by numeral 66, and the container may be filled with a damping liquid so as to fill the space between the diaphragms and thereby reduce the element of vibration or shock response in the instrument. This liquid is preferably of the same density as the fuel.

The shaft 28b which carries lever arm 29b is shown as being supported in bearings 67 and 67' mounted on top of the container 65. The lower end of the arm 29b is connected to the link 37b which in turn is attached pivotally to a lever arm 38b which is secured to the shaft 13b which carries the pointer 11b. This shaft 13b is shown as being carried by bearings 69 and 69' in downwardly extending legs or brackets 70 and 70' that are shown as being attached to the container 65.

In this form of my invention the force resulting from the differential pressure between the diaphragms 25b and 26b is applied to the shaft 28b through a downwardly extending finger 76, the lower end of which is confined between buttons 77 and 77' at the mid portions of the two diaphragms.

Also secured to the shaft 13b is a second arm 38b' the end of which is attached to a link 48b and to which the force derived from the centrifugal mechanism is applied. It will be noted that these two arms 38b and 38b' take the place of the single arm 38 of Fig. 2. The relationship, to these two arms respectively, of the two force generating and applying systems and linkages, is the same as in Fig. 2.

The lower end of link 48b is connected by a ball-and-socket connection or other similar connections 71b to the end of the arm 45b, whose angular extension 45b' which carries the weight 47b. This arm is the same in construction and operation as the arm 45—45' of Fig. 2, such arm being carried by the rotor 40b which is supported on a shaft 40b' extending downwardly through a bearing hub 73 and is connected at 42b to a flexible cable or other suitable driving means leading from the running gear of the vehicle.

The diaphragm compensating spring 33b is shown as being suspended from a connection $d$ on a cross member 74 and is attached to a pin 75 on the arm 29b.

It will be apparent that the principle of operation involved in this form of my invention is identical with that described above in connection with Figs. 1, 2 and 6, and although this embodiment of the invention is considered as being of compact form which can readily be assembled it is to be understood that the invention may take various other forms depending upon the particular conditions in which it is to be used. As has been previously pointed out the invention may be associated with a mechanical or magnetic speedometer of conventional type and it may be desired to put both the speedometer and the efficiency indicator in the single case. Such an arrangement is more or less diagrammatically illustrated in Fig. 8 wherein the case 60' is shown as being provided with two slots 62' and 62a one of which is associated with the speedometer needle and the other of which is asociated with the efficiency meter pointer. As will be obvious, the same vehicle speed drive (flexible shaft or the like) may be used to drive both instruments.

It will be apparent from the foregoing discussion that in the type of instrument shown in Figs. 2 to 4 inclusive, the two forces which actuate the pointer are proportional to the second power of the time rate of performance (speed) and the rate of fuel consumption (flow) respectively.

With suitable linkage then (approximately as shown in the drawings) the efficiency may be expressed as follows:

$$E \alpha \frac{s}{r} \alpha \sqrt{\frac{f_1}{f_2}} \alpha \sqrt{\sin \psi \tan \theta_1 - \cos \psi_1}$$

This relation provides a scale which is nearly linear over a wide range. Various linkages may be employed to introduce multiplying factors and vary the scale but they will not affect the accuracy or princple of the instrument.

It is possible that in some applications of the instrument, where precision readings are required for example, it may be desirable to compensate the fact that the pressure difference across the orifice may not be exactly proportional to the square of the velocity of flow through the orifice, but involves a small additive term depending upon the viscosity.

Such compensation may be made through an arrangement of the type shown in Fig. 5 which shows a modified form of orifice and diaphragm connection in which the elements are indicated by the same reference numerals used in Fig. 3 distinguished by the letter c. Here it will be observed that the conduit 23c contains a small float member 80 in a constricted portion 80'; this member is pivoted to the upper end of small lever 81 which is pivoted at 82 and whose lower end is bent into an extension 83 which is in contact with the center of the "down-stream" diaphragm 26c. By this means the force due to the small viscous drag of the flowing fuel on the float is transmitted to the diaphragm, and thus reduces the force exerted by this diaphragm about the pointer axis. With suitable proportions of float and constriction, it is possible to produce a force which will compensate approximately for the slight effect of viscosity on the pressure differential across the orifice. The member 80 is a float of substantially the same effective density as the fuel so that it will float without appreciable frictional contact with walls of the passage 80'.

In the form of my invention shown in Fig. 7 I have illustrated a modification in which the forces acting upon the pointer (according to principle of Fig. 1) are proportioned to the first power of the speed and rate of flow respectively. In this form of my invention, the viscosity of the fuel is eliminated as a factor tending to vary the ratio between the forces, by virtue of the fact that the viscosity enters as an element in obtaining each force and cancels out in the ratio.

Referring to Fig. 7, reference numeral 90 indicates a cell or closed container interposed in the fuel line 20d—20d' so as to be completely filled with liquid when fuel is flowing in the line. It will be observed that the cell has an inlet 91 and an outlet 92 at the bottom, preferably positioned on a diameter of the cell, and that the outlet communicates with the outlet conduit section 20d' through a T connection 93 which communicates at 94 with a diaphragm chamber 95 in the top of the cell.

The chamber 95 carries a diaphragm 96 connected through a link 97 with a lever member 38d. This lever member 38d is carried by the indicator shaft 13d which is supported by bearing bracket 120, and carries the pointer 11d.

Also secured to the indicator shaft is a lever member 38d' to which is attached a flexible tension member such as a cable or chain 98. The flexible member 98 runs to a wheel 100 to which its other end is attached. The wheel 100 is secured to a vertical shaft 101 mounted between bearing members 102 and 103, such shaft carrying disc or discs indicated generally at 104.

Mounted in the case below discs 104 is a spindle 105 contained in a bearing hub 106 and adapted to be driven from the engine or vehicle through a connection 107. The spindle 105 carries a disc or discs 108 positioned in spaced parallel relation with the disc 104.

In operation, the disc or discs 108 rotate with angular velocity proportional to the speed of the engine or vehicle, exerting a viscous drag on the disc or discs 104, which by means of the flexible member 98, transmits a force to the arm 38d' mounted radially on the pointer shaft. The opposing force depending on the flow of fuel is exerted by the diaphragm 96 by means of link 97 jointed to radial arm 38d mounted on pointer shaft, and is proportional to the pressure differential between the liquid in the cell and the liquid in the conduit in the region D of outflow beyond the constriction $D_1$.

By Poiseuille's law the rate of flow through the restricted conduit $D_1$ is $$r = \frac{\pi a^4}{8Ln}(P_1 - P_2)$$

where $a$ is the radius of the tube, $L$ its length, $P_1$ and $P_2$ the pressures in the cell and at the region D, respectively, and $n$ the viscosity of the liquid. Since the force exerted by the diaphragm is proportional to this pressure difference, the force acting upon the arm 38d may be expressed as $f_2 = k_2 n r$ when $k_2$ is a constant for the instrument and $r$ the rate of flow.

The force ($f_1$) depending on the speed may be expressed as $f_1 = k_1 n s$ where $k_1$ is another constant and $s$ the speed. Consequently the efficiency E becomes $$E = \frac{s}{r} = \frac{\frac{f_1}{k_1 n}}{\frac{f_2}{k_2 n}} = \frac{k_2 f_1}{k_1 f_2} = \frac{k f_1}{f_2}$$

where $k$ is a constant for the instrument.

In this case it will be seen that the variable viscosity factor $n$ cancels out so that the fundamental condition required is satisfied, i. e. the efficiency depends only on ratio of the forces. Also the condition that the forces $f_1$ and $f_2$ be proportional to this same (in this case the first) power of the rates is satisfied.

In this type of instrument, a double set of discs 104, 108, as shown, and about 5 cm. radius, will give a torque on the viscously driven discs of about five gram centimeters, when operating at ordinary speeds in a liquid like benzol at ordinary temperatures. That is a force considered to be sufficiently large for operation of a practical sized instrument.

Assuming now, for purposes of illustrative figures, that the radius of wheel 100 and the lengths of arms 38d and 38d' are equal; then, again assuming average fuel consumption of an automobile at an ordinary speed, the diameter of diaphragm 96 would be about 3 cm.; and the length and diameter of restricted passage $D_1$ would be, respectively, about 5 cm. and 2 mm. The discs are spaced apart about one mm.

With properly balanced discs it is evident that this device will be practically shock proof, since the liquid on either side of the diaphragm will exert the same pressure in consequence of any shock acceleration.

By arranging the cranks 38d and 38d' on the pointer shaft so that the effective angle between the directions of applied forces is about 120°, a practically linear scale may be obtained.

The compensating spring 330 in this embodiment is shown as attached at point 331 to arm 332 which is pivotally mounted on the body of instrument at 333 and attached to link 97 at point 334. The other end of the spring is attached to the body or case of the instrument at point 335. The position indicated is that occurring when the diaphragm is not displaced, when also in practice the pointer would be near center of scale. The same considerations of design apply to this spring as to the one described in connection with Fig. 2.

Another form of the invention, embodying the same general principles, is represented in Fig. 9. Here the force $f_1$ (depending on the rate of engine performance) is derived in the same manner as in Fig. 7; those parts of Fig. 9 which correspond to Fig. 7 have the same numerals applied and will not be re-described. The chain or cord 98 is here connected to the arm 38d' on the indicator shaft 13d.

The force $f_2$ (depending on the rate of fuel consumption) is produced by the pressure differential and the viscous drag of fuel flowing in a restricted outlet passage 200, in which a drag float 201 operates; the float being preferably of the same effective density as the fuel so as not to frictionally engage the walls of the passage. Small localized guiding projections 202 may project inwardly from the passage wall to guide the float, with substantially no friction and with no substantial effect on the flow around the float.

The float is connected by member 203 with the arm 38d" on the indicator shaft. An angle of 60° between the arms 38d' and 38d" maintains the same effective angle 120° between the effective lines of force application; the effect is the same as in Fig. 1.

From elementary hydrodynamical principles it can be shown that the force $f_2$ is in this case directly proportional to the rate of fuel flow and the viscosity of the liquid. Since (as shown in connection with Fig. 7) the force $f_1$ is proportional to the speed (of the engine or automobile) and also to the fuel viscosity; the ratio of the two forces becomes a ratio of fuel flow rate and engine or automobile speed, viscosity cancelling out as it appears in both factors of the ratio.

Assuming the same dimensions for the parts generating the force $f_1$, given in connection with Fig. 7, approximate typical and suitable dimensions for the parts involved in the generation of force $f_2$ are: outlet passage 200 one cm. diameter; float 201 ten cm. long, and 0.990 cm. in diameter.

The scale, in this case, will be very nearly linear, except near the extreme ends.

To simplify and explain certain terminology that is used in the claims, it is desirable finally to give some brief consideration to what is meant by the effective angle between the lines of force application to the arm or arms (arm structure) on the pointer or indicator shaft.

In Figs. 1 and 2 the two forces ($f_1$ and $f_2$) are shown as applied to the same point on the same single arm. In Fig. 1 the actual, and effective, angle between the lines of application of the two forces to the point on the arm, is shown as 120°; and in Fig. 2, is 90°.

Now, suppose we next consider a modification of the arrangement shown in Fig. 1, such as specifically diagrammed in Fig. 1a. In Fig. 1a force $f_1$ and arm 11 are shown as in Fig. 1. Force $f_2$, and its (in this case separate) arm 110 have been rotated around, through 120°, to a position where the lines of the two forces are parallel, and there is now an angle of 120° between the two arms. But, in this case, just as in Fig. 1, the effective angle between the lines of force application to the two arms (the arm structure) is still 120°. In Fig. 1 where the chosen angle between $f_1$ and $f_2$ is 120°, it is obvious that the sum of the angles which the two force lines make with the single arm 11, is also 120°. In Fig. 1a, to preserve the same effective 120° angle, the sum of angles $n$ and $o$ is likewise 120°, to preserve the effective angle between the force applications.

In Fig. 3, where the links 48b and 37b (the lines of force) are approximately 120° apart (but the force in 37b acts in a direction opposite— rotated 180°—from the relative direction in Fig. 1), the arm 38b is likewise in a position rotated 180° from the position of arm 38b'. This again maintains an effective angle between the lines of force application, to point on the arm structure, of 120°.

In Fig. 7, where the force lines are at right angles to each other, an angle of 150° between the two arms, makes the effective angle between force applications to the arm point, 120°.

For reasons given in the foregoing, the effective angle between the lines of force application to the arm structure is, as stated, preferably approximately 120°. However, while this angle is subject to considerable modification, it is necessary, for obvious reasons, that it be less than a straight angle. A variational manner of expressing this essential relation is to say that the sum of the angles included between the lines along which the two forces are applied and the respective radii joining the points of application of the forces and the axis of rotation, e. g., the sum of angles $n$ and $o$ in Fig. 1a, is less than a straight angle.

Although I have herein described and illustrated certain preferred embodiments of my invention, and have described the same as being applied to a particular use, it is to be understood that my invention is not limited to the particular embodiments or applications described above but includes within its scope such changes or modifications as fairly come within the spirit of the appended claims.

I claim:

1. In a ratio indicating instrument, the combination of an arm structure rotatable on a fixed axis, an indicator operable by the rotation of the arm structure, means comprising a link pivotally connected with a point on said arm structure for applying a rotative force to said structure, and means comprising a second link pivotally connected with a point on said arm structure for applying counterrotative force to said structure, the angle between the direction line of application of one of said forces and the radius joining the point of application of said force with the rotative arm structure and the axis of rotation plus the angle between the direction line of application of the other of said forces and the radius joining the point of application of said other force with the rotative arm structure and said axis being less than a straight angle, the arm structure being otherwise freely rotatable on said axis.

2. In an instrument for indicating the ratio of two forces, the combination of an arm structure rotatable on a fixed pivot axis, an indicator moved by virtue of rotation of the arm structure about said axis, and means connected with the rotatable arm structure for applying the two forces to said arm structure in an opposing sense and along substantially fixed direction lines which are offset from said axis, the sum of the angles made by said direction lines with the respective radii joining the points of application of the forces with the arm structure and the fixed pivot axis of the arm structure being approximately 120°, the pivoted arm structure being otherwise freely rotatable on its said axis and being substantially in neutral equilibrium except for the effect of said applied forces, and said applied forces rotating said arm structure about said fixed axis to a position uniquely indicating the ratio of the applied forces.

3. In an instrument for indicating the ratio of two forces, the combination of an arm structure rotatable on a fixed pivot axis, an indicator operable by the rotation of the arm structure through a predetermined range, and means connected with the rotatable arm structure for applying the two forces to said arm structure in an opposing sense and along substantially fixed direction lines which are offset from said axis, the sum of the angles made by said direction lines with the respective radii joining the points of application of the forces with the arm structure and the pivot axis of the arm structure being less than a straight angle, and said angles being approximately equal to one another when the indicator is at the medial portion of its said predetermined range, the pivoted arm structure being otherwise freely rotatable on its said axis and being substantially in neutral equilibrium except for the effect of said applied forces, and said applied forces rotating said arm structure about said fixed axis to a position uniquely indicating the ratio of the applied forces.

4. In an instrument for indicating the ratio of two forces, the combination of an arm structure rotatable on a fixed pivot axis, an indicator operable by the rotation of the arm structure through a predetermined range, and means connected with the rotatable arm structure for applying the two forces to said arm structure in an opposing sense and along substantially fixed direction lines which are offset from said axis, the sum of the angles made by said direction lines with the respective radii joining the points of application of the forces with the arm structure and the pivot axis of the arm structure being approximately 120°, and said angles being approximately equal to one another when the indicator is at the medial portion of its said predetermined range, the pivoted arm structure being otherwise freely rotatable on its said axis and being substantially in neutral equilibrium except for the effect of said applied forces, and said applied forces rotating said arm structure about said fixed axis to a position uniquely indicating the ratio of the applied forces.

5. In an instrument for indicating the ratio of two forces, the combination of an arm structure rotatable on a fixed pivot axis, an indicator operable by the rotation of the arm structure through a predetermined range, and means connected with the rotatable arm structure for applying the two forces to said arm structure in an opposing sense and along substantially fixed direction lines which are offset from said axis, each of said direction lines making a substantial angle with its respective radius joining the point of application of the corresponding force with the arm structure and the pivot axis of the arm structure when the indicator is within its said predetermined range, and the sum of said angles being less than a straight angle, the pivoted arm structure being otherwise freely rotatable on its said axis and being substantially in neutral equilibrium except for the effect of said applied forces, and said applied forces rotating said arm structure about said fixed axis to a position uniquely indicating the ratio of the applied forces.

ROY J. KENNEDY.